United States Patent
Eckert et al.

(10) Patent No.: US 10,239,762 B2
(45) Date of Patent: Mar. 26, 2019

(54) POWER PLANT FOR PRODUCING ENERGY AND AMMONIA

(71) Applicant: Siemens Aktiengesellschaft, Munich (DE)

(72) Inventors: Helmut Eckert, Roettenbach (DE); Guenter Schmid, Hemhofen (DE); Dan Taroata, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 76 days.

(21) Appl. No.: 15/511,261

(22) PCT Filed: Sep. 11, 2015

(86) PCT No.: PCT/EP2015/070805
§ 371 (c)(1),
(2) Date: Mar. 15, 2017

(87) PCT Pub. No.: WO2016/045990
PCT Pub. Date: Mar. 31, 2016

(65) Prior Publication Data
US 2017/0291824 A1    Oct. 12, 2017

(30) Foreign Application Priority Data

Sep. 24, 2014   (DE) .................. 10 2014 219 274

(51) Int. Cl.
| | | |
|---|---|---|
| C01C 1/02 | (2006.01) |
| F02C 6/10 | (2006.01) |
| B01J 19/24 | (2006.01) |
| B01J 19/26 | (2006.01) |
| C01B 21/06 | (2006.01) |
| F01D 15/10 | (2006.01) |

(52) U.S. Cl.
CPC ............ *C01C 1/026* (2013.01); *B01J 19/245* (2013.01); *B01J 19/26* (2013.01); *C01B 21/061* (2013.01);
(Continued)

(58) Field of Classification Search
None
See application file for complete search history.

(56) References Cited

U.S. PATENT DOCUMENTS 3,754,147 A * 8/1973 Hancock .............. F01K 25/005
290/1 R
5,152,977 A   10/1992 Zardi et al. .................. 423/659
(Continued)

FOREIGN PATENT DOCUMENTS

| AT | 507667 A4 | 7/2010 | ........... C01B 21/076 |
| DE | 1965898 A1 | 10/1970 | ............. C01B 21/16 |

(Continued)

OTHER PUBLICATIONS

"Fliehkraftabscheider"; Wikipedia, URL: https://de.wikipedia.org, 8 pages (w/ English translation), Jul. 28, 2015.

(Continued)

*Primary Examiner* — Anthony J Zimmer
(74) *Attorney, Agent, or Firm* — Slayden Grubert Beard PLLC

(57) ABSTRACT

The present disclosure relates to power plants. The teachings thereof may be embodied in processes for producing ammonia and energy, e.g., a method for producing ammonia and energy comprising: spraying or atomizing an electropositive metal; burning the metal with a reaction gas; mixing the reacted mixture with water; separating the mixture into (a) solid and liquid constituents and (b) gaseous constituents; at least partially converting energy of the solid and liquid constituents and of the gaseous constituents; and separating ammonia from the gaseous constituents. Mixing the reacted mixture may include spraying or atomizing the water or the aqueous solution or the suspension of the hydroxide of the electropositive metal into the reacted mixture.

5 Claims, 2 Drawing Sheets

(52) U.S. Cl.
CPC ............ *C01B 21/0612* (2013.01); *C01C 1/02* (2013.01); *F02C 6/10* (2013.01); *B01J 2208/00902* (2013.01); *F01D 15/10* (2013.01); *F05D 2220/31* (2013.01); *F05D 2220/62* (2013.01); *Y02E 20/14* (2013.01); *Y02P 20/129* (2015.11)

(56) References Cited

U.S. PATENT DOCUMENTS

| | | | |
|---|---|---|---|
| 7,413,721 B2 * | 8/2008 | Kong ..................... | C01B 3/047 423/353 |
| 2013/0260263 A1 | 10/2013 | Schmid et al. ............... | 429/400 |

FOREIGN PATENT DOCUMENTS

| | | | | |
|---|---|---|---|---|
| DE | 102008031437 A1 | 1/2010 | ............... | C05D 9/00 |
| EP | 2610214 A1 | 7/2013 | ............. | C01B 13/02 |
| KR | 1020140031527 A | 3/2014 | .......... | C01B 21/072 |
| WO | 02/090255 A1 | 11/2002 | .......... | C01B 21/072 |
| WO | 2007/016343 A2 | 2/2007 | ................ | C01C 1/00 |
| WO | 2012/038330 A2 | 3/2012 | ............. | B01D 53/62 |
| WO | 2013/156476 A1 | 10/2013 | ............. | B01D 53/50 |
| WO | 2016/045990 A1 | 3/2016 | ............. | B01J 19/24 |

OTHER PUBLICATIONS

International Search Report and Written Opinion, Application No. PCT/EP2015/070805, 13 pages, dated Nov. 30, 2015.

\* cited by examiner

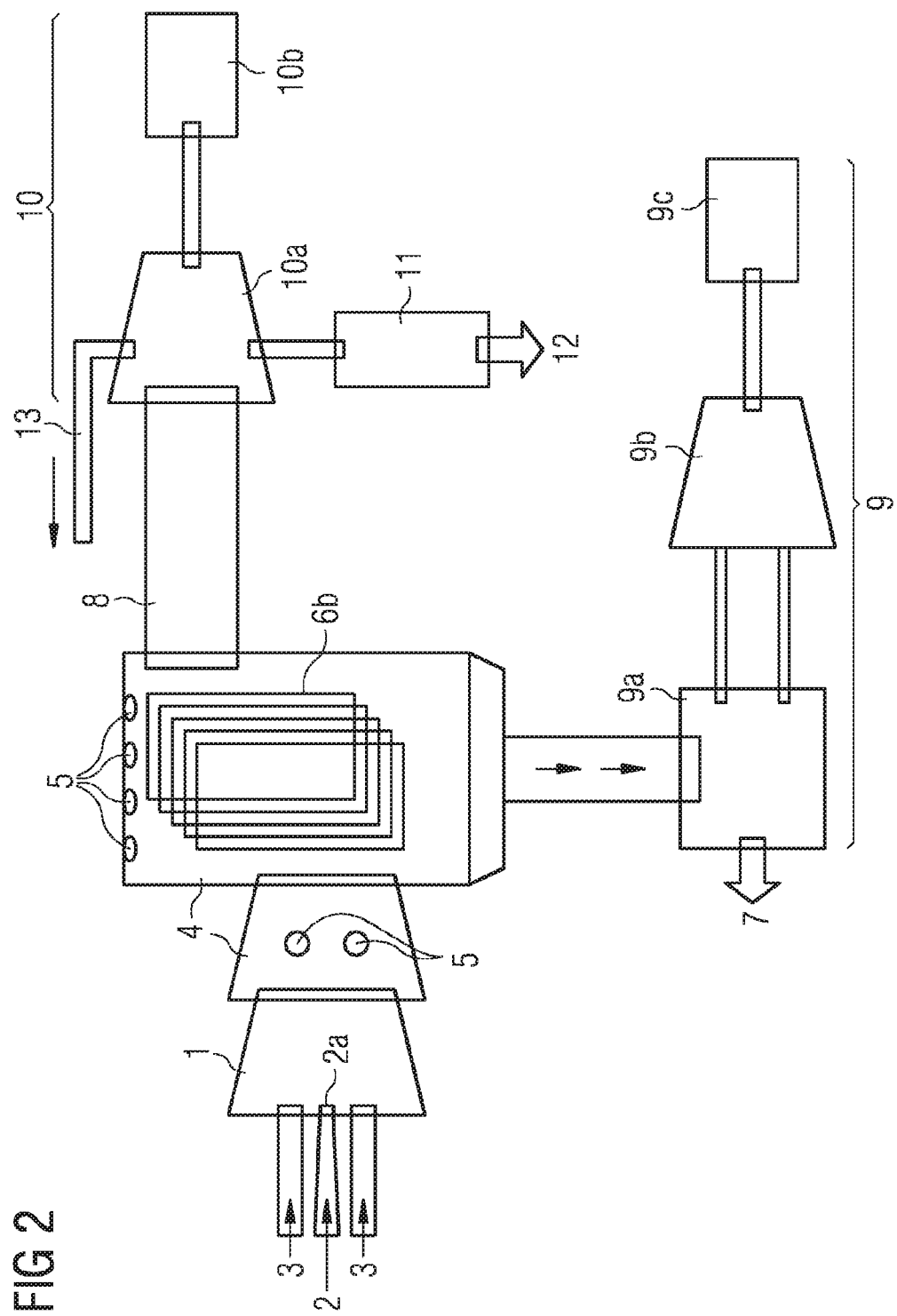

POWER PLANT FOR PRODUCING ENERGY AND AMMONIA

CROSS-REFERENCE TO RELATED APPLICATIONS

This application is a U.S. National Stage Application of International Application No. PCT/EP2015/070805 filed Sep. 11, 2015, which designates the United States of America, and claims priority to DE Application No. 10 2014 219 274.9 filed Sep. 24, 2014, the contents of which are hereby incorporated by reference in their entirety.

TECHNICAL FIELD

The present disclosure relates to power plants. The teachings thereof may be embodied in processes for producing ammonia and energy.

BACKGROUND

Due to requirements for reducing carbon dioxide emission, various possible ways of generating energy from alternative resources have been discussed in recent times. DE102008031437.4 describes how recyclable energy circuits can be created using alkali metals. These are elaborated in more detail in WO2012/038330 and WO2013/156476. The combustion of electropositive metals such as lithium, sodium, potassium, magnesium, calcium, strontium, barium, and also aluminum or zinc is possible not only in air but also in carbon dioxide ($CO_2$) or water ($H_2O$). Here, the basic chemical substances carbon monoxide (CO) or hydrogen ($H_2$) are formed.

As an alternative, electropositive metals can also react with nitrogen. DE 102014203039.0 describes how the lithium nitride formed can be separated by means of a cyclone after the combustion. However, a subsequent hydrolysis is not considered in detail, although this liberates still considerable quantities of heat ($Li_3N+3H_2O\rightarrow 3$ $LiOH+NH_3-444$ kJ). In addition, abrasive particles can get into the expander of the gas turbine in DE 102014203039.0.

SUMMARY

There is a need for an effective process for obtaining energy and a product of value, ammonia, in the combustion of nitrogen-containing reaction gases with electropositive metals. Power station plants which can make efficient conversion of the energy stored in electropositive metals into electric power possible or which can supply the materials of value produced in the combustion process with nitrogen to a chemical use are described below. An effective reaction procedure and an improved yield in terms of energy can be achieved when a reaction mixture composed of a reaction gas comprising nitrogen and an electropositive metal is supplied, during or after the reaction, with water and/or an aqueous solution and/or suspension of a hydroxide of an electropositive metal.

Some embodiments may include a process for producing ammonia and energy, wherein an electropositive metal selected from among alkali metals, alkaline earth metals, aluminum and zinc and mixtures and/or alloys thereof is sprayed and/or atomized and burnt with a reaction gas comprising nitrogen. The reacted mixture of reaction gas and electropositive metal is mixed with water and/or an aqueous solution and/or suspension of a hydroxide of the electropositive metal. The mixture which has been mixed with water and/or the aqueous solution and/or suspension of a hydroxide of the electropositive metal is separated into firstly solid and/or liquid constituents (7) and secondly gaseous constituents (8). The energy of firstly the solid and/or liquid constituents (7) and secondly of the gaseous constituents (8) is at least partly converted and ammonia is separated off from the gaseous constituents (8). The mixing of the reacted mixture of reaction gas and electropositive metal with water and/or an aqueous solution and/or suspension of a hydroxide of the electropositive metal is effected by spraying of liquid and/or gaseous water and/or spraying and/or atomization of an aqueous solution and/or suspension of a hydroxide of the electropositive metal into the reacted mixture.

In some embodiments, the separation into firstly solid and/or liquid constituents (7) and secondly gaseous constituents (8) is carried out by means of a cyclone and/or filter plates and/or electrofilters.

In some embodiments, the at least partial conversion of the energy from the solid and/or liquid constituents (7) is carried out with the aid of at least one heat exchanger.

In some embodiments, the molar ratio of water to nitride formed in the combustion of reaction gas and electropositive metal is greater than 2:1, greater than 3:1 and/or greater than 3.5:1.

In some embodiments, the at least partial conversion of the energy from the gaseous constituents (8) into electric energy is carried out by means of at least one turbine and at least one generator.

In some embodiments, the electropositive metal is burnt with an excess of nitrogen.

In some embodiments, excess nitrogen is separated off from the gaseous constituents (8) after the combustion and is recirculated to the combustion.

Some embodiments may include an apparatus for producing ammonia and energy comprising: a first reactor; at least one first spraying device and/or atomization device (2a) for spraying and/or atomizing the electropositive metal, which is configured for spraying and/or for atomizing the electropositive metal into the first reactor; at least one first feed device (2) for the electropositive metal, which is configured for feeding the electropositive metal to the at least one first spraying device and/or atomization device (2a); at least one second feed device (3) for reaction gas comprising nitrogen, which is configured for feeding the reaction gas comprising nitrogen to the first reactor; a second reactor; at least one second spraying device and/or atomization device (5) for spraying and/or atomizing water and/or the aqueous solution and/or suspension of a hydroxide of the electropositive metal, which is configured for spraying and/or atomizing water and/or the aqueous solution and/or suspension of a hydroxide of the electropositive metal into the second reactor; at least one third feed device for water and/or an aqueous solution and/or suspension of a hydroxide of the electropositive metal, which is configured for feeding water and/or the aqueous solution and/or suspension of a hydroxide of the electropositive metal to the at least one second spraying device and/or atomization device (5); a first separation device (6) in which the mixture mixed with water and/or the aqueous solution and/or suspension of a hydroxide of the electropositive metal is separated into firstly solid and/or liquid constituents (7) and secondly gaseous constituents (8) and which is configured for separating the mixture mixed with water and/or the aqueous solution and/or suspension of a hydroxide of the electropositive metal into firstly solid and/or liquid constituents (7) and secondly gaseous constituents (8); at least one first device (9) for converting energy, which is configured for at least partly converting the energy of the solid and/or liquid constituents (7); at least one second device (10) for converting energy, which is configured for at least partly converting the energy of the gaseous constituents (8); and a second separation device in which ammonia is separated off from the gaseous constituents and which is configured for separating off ammonia from the gaseous constituents. In the first reactor (1), an electropositive metal selected from among alkali metals, alkaline earth metals, aluminum and zinc and mixtures and/or alloys thereof is allowed to react with a reaction gas comprising nitrogen and the reaction gas comprising nitrogen reacts with the electropositive metal. In the second reactor (4), the reacted mixture of reaction gas and electropositive metal is mixed with water and/or an aqueous solution and/or suspension of a hydroxide of the electropositive metal and is configured for mixing the reacted mixture of reaction gas and electropositive metal with water and/or the aqueous solution and/or suspension of a hydroxide of the electropositive metal.

In some embodiments, the first separation device (6) has a cyclone (6a) and/or at least one filter plate and/or at least one electrofilter (6b).

In some embodiments, the at least one first device (9) for converting energy has at least one heat exchanger (9a).

In some embodiments, a control device sets the molar ratio of water and/or the aqueous solution and/or suspension of a hydroxide of the electropositive metal to nitride formed in the combustion of reaction gas and electropositive metal by controlling the at least one first feed device (2) for electropositive metal and/or the at least one second feed device (3) for reaction gas comprising nitrogen and/or the at least one third feed device for water and/or the aqueous solution and/or suspension of a hydroxide of the electropositive metal in such a way that the molar ratio of water and/or the aqueous solution and/or suspension of a hydroxide of the electropositive metal to nitride formed in the combustion of reaction gas and electropositive metal is greater than 2:1, preferably greater than 3:1 and particularly preferably greater than 3.5:1.

In some embodiments, the at least one second device (10) for converting energy has at least one turbine (10a) and at least one generator (10b) for generating electric energy.

In some embodiments, the second separation device is configured for additionally separating off nitrogen from the gaseous constituents.

In some embodiments, a recirculation device (13) for nitrogen from the second separation device is configured for feeding nitrogen from the second separation device to the second feed device (3) for reaction gas comprising nitrogen and/or to the first reactor (1).

BRIEF DESCRIPTION OF THE DRAWINGS

The accompanying drawings are intended to illustrate embodiments of the present teachings and give a better understanding thereof. In conjunction with the description, they serve to explain concepts and principles of the disclosure. Other embodiments and many of the advantages mentioned can be seen from the drawings. The elements of the drawings are not necessarily shown to scale relative to one another. Elements, features and components which are identical, have the same function or act in the same way are, unless indicated otherwise, in each case denoted by the same reference numeral in the figures of the drawings.

FIG. 2 schematically shows a second illustrative embodiment of an apparatus in the form of a coupled power station for the synthesis of ammonia and production of electricity having an electroprecipitator according to teachings of the present disclosure.

DETAILED DESCRIPTION

Figure 1:
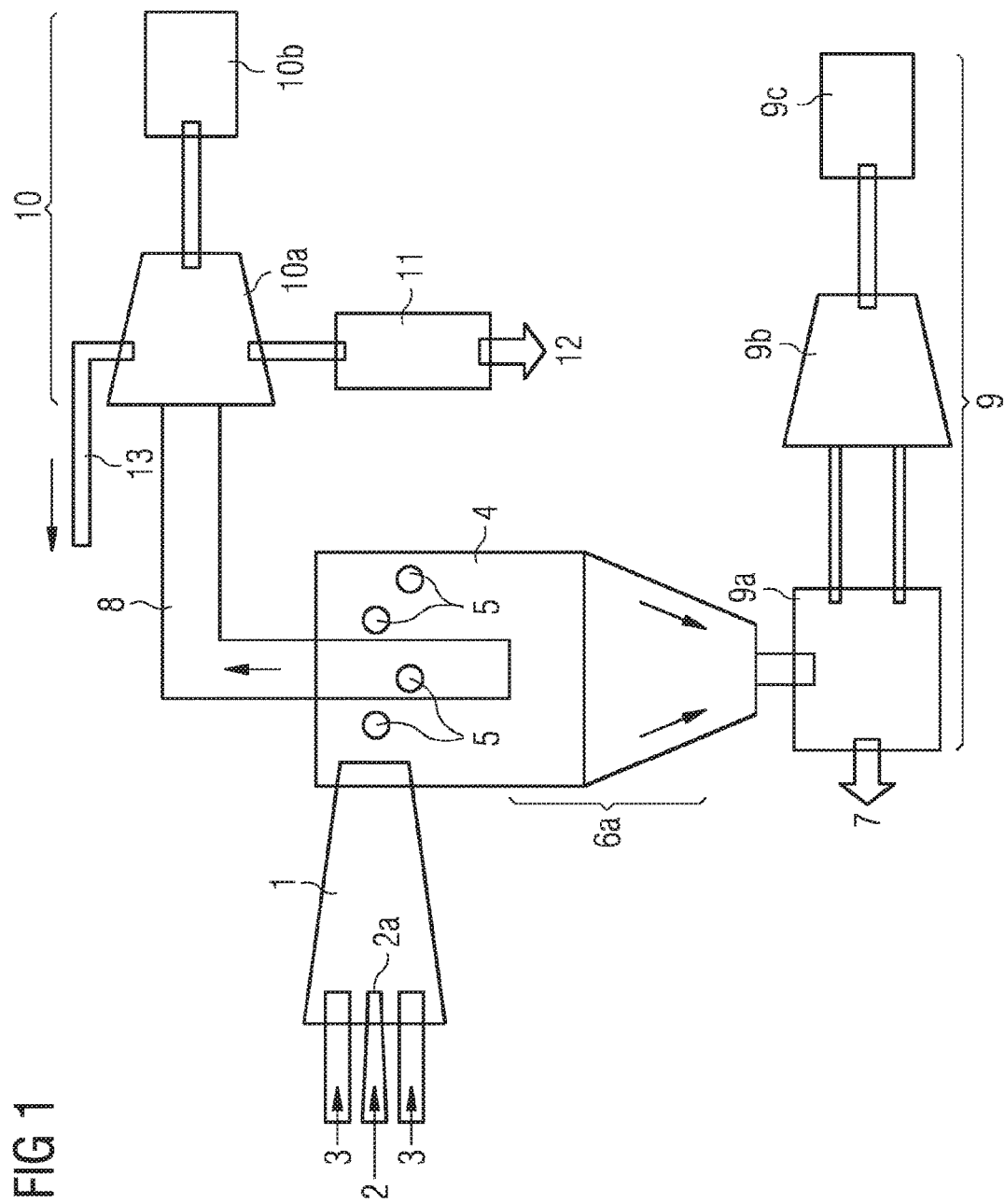
FIG. 1 schematically shows a first illustrative embodiment of an apparatus in the form of a coupled power station for the synthesis of ammonia and production of electricity having a cyclone according to teachings of the present disclosure.

In some embodiments, the teachings of the present disclosure may include processes for producing ammonia and energy, wherein an electropositive metal selected from among alkali metals, alkaline earth metals, aluminum, zinc, and mixtures and/or alloys thereof is sprayed and/or atomized and burnt with a reaction gas comprising nitrogen. The reacted mixture of reaction gas and electropositive metal is mixed with water and/or an aqueous solution and/or suspension of a hydroxide of the electropositive metal. The mixture which has been mixed with water and/or the aqueous solution and/or suspension of a hydroxide of the electropositive metal is separated into firstly solid and/or liquid constituents and secondly gaseous constituents. The energy of firstly the solid and/or liquid constituents and secondly of the gaseous constituents is at least partly converted and ammonia is separated off from the gaseous constituents. The mixing of the reacted mixture of reaction gas and electropositive metal with water and/or an aqueous solution and/or suspension of a hydroxide of the electropositive metal is effected by spraying and/or atomization of liquid or gaseous water and/or an aqueous solution and/or suspension of a hydroxide of the electropositive metal into the reacted mixture.

In some embodiments, an apparatus for obtaining ammonia and energy, comprises: a first reactor in which an electropositive metal selected from among alkali metals, alkaline earth metals, aluminum and zinc and mixtures and/or alloys thereof is allowed to react with a reaction gas comprising nitrogen and which is configured for reacting the reaction gas comprising nitrogen with the electropositive metal; at least one first spraying device and/or atomization device for spraying and/or atomizing the electropositive metal, which is configured for spraying and/or for atomizing the electropositive metal into the first reactor; at least one first feed device for the electropositive metal, which is configured for feeding the electropositive metal to the at least one first spraying device and/or atomization device; at least one second feed device for reaction gas comprising nitrogen, which is configured for feeding the reaction gas comprising nitrogen to the first reactor; a second reactor in which the reacted mixture of reaction gas and electropositive metal is mixed with water and/or an aqueous solution and/or suspension of a hydroxide of the electropositive metal and is configured for mixing the reacted mixture of reaction gas and electropositive metal with water and/or the aqueous solution and/or suspension of a hydroxide of the electropositive metal; at least one second spraying device and/or atomization device for spraying and/or atomizing water and/or the aqueous solution and/or suspension of a hydroxide of the electropositive metal, which is configured for spraying and/or atomizing water and/or the aqueous solution and/or suspension of a hydroxide of the electropositive metal into the second reactor; at least one third feed device for water and/or an aqueous solution and/or suspension of a hydroxide of the electropositive metal, which is configured for feeding water and/or the aqueous solution and/or suspension of a hydroxide of the electropositive metal to the at least one second spraying device; a first separation device in which the mixture mixed with water and/or the aqueous solution and/or suspension of a hydroxide of the electropositive metal is separated into firstly solid and/or liquid constituents and secondly gaseous constituents and which is configured for separating the mixture mixed with water and/or the aqueous solution and/or suspension of a hydroxide of the electropositive metal into firstly solid and/or liquid constituents and secondly gaseous constituents; at least one first device for converting energy, which is configured for at least partly converting the energy of the solid and/or liquid constituents; at least one second device for converting energy, which is configured for at least partly converting the energy of the gaseous constituents; and a second separation device in which ammonia is separated off from the gaseous constituents and which is configured for separating off, for example condensing, ammonia from the gaseous constituents.

The teachings of the present disclosure may be embodied in processes for producing ammonia and energy, wherein an electropositive metal selected from among alkali metals, alkaline earth metals, aluminum and zinc and mixtures and/or alloys thereof is sprayed and/or atomized and burnt with a reaction gas comprising nitrogen, the reacted mixture of reaction gas and electropositive metal is mixed with water and/or an aqueous solution and/or aqueous suspension of a hydroxide of the electropositive metal, the mixture which has been mixed with water and/or the aqueous solution and/or aqueous suspension of a hydroxide of the electropositive metal is separated into firstly solid and/or liquid constituents and secondly gaseous constituents, the energy of firstly the solid and/or liquid constituents and secondly of the gaseous constituents is at least partly converted and ammonia is separated off from the gaseous constituents, where the mixing of the reacted mixture of reaction gas and electropositive metal with water and/or an aqueous solution and/or aqueous suspension of a hydroxide of the electropositive metal is effected by spraying of liquid and/or gaseous water and/or an aqueous solution and/or aqueous suspension of a hydroxide of the electropositive metal into the reacted mixture.

An aqueous solution and/or suspension of a hydroxide of the electropositive metal refers to an aqueous solution of a hydroxide of the electropositive metal and/or an aqueous suspension of a hydroxide of the electropositive metal.

An at least partial conversion of the energy of firstly the solid and/or liquid constituents and secondly of the gaseous constituents encompasses any at least partial conversion of the energy, for example thermal and/or kinetic energy, liberated by and/or present in the reaction of electropositive metal and reaction gas and the mixing with water and/or an aqueous solution and/or aqueous suspension of a hydroxide of the electropositive metal into a further form of energy, e.g., electric power. For example, the energy can be converted into thermal energy of another medium such as water in, for example, a heat exchanger or into electric energy. The quantity of the converted energy depends on various factors such as efficiencies of the devices used for conversion, possibly energy losses in the system, the control of the reaction and of the streams of substances, etc.

The electropositive metal is, in some embodiments, selected from among alkali metals, e.g., Li, alkaline earth metals, Mg, Ca, Sr and Ba, Al, and Zn and mixtures and/or alloys thereof. In some embodiments, the electropositive metal is selected from among Li, Mg, Ca, Sr, Ba, and Zn. Mixtures and/or alloys of the electropositive metal are also possible. Zn and Al may form relatively stable nitrides and may make separation more difficult.

In some embodiments, the reaction gas comprises nitrogen. The reaction may include nitrogen and the electropositive metal without further gases which react with the electropositive metal under the process conditions being present in the reaction gas. For example, inert gases such as noble gases can be present. The reaction gas may comprise more than 50% by volume of nitrogen, more than 75% by volume of nitrogen, more than 90% by volume of nitrogen, and/or more than 95% by volume of nitrogen. In some embodiments, the reaction gas consists of nitrogen, apart from unavoidable impurities which arise, for example, in the separation of nitrogen from air, e.g., by means of an air fractionation plant. In the case of reaction gases in which the gas present in addition to nitrogen can react with the electropositive metal (e.g., $O_2$, $CO_2$), for example when nitrogen is separated off from air to produce the reaction gas, nitrogen contents of >90% by volume, and/or >95% by volume, may provide improved results. Typically, only small amounts of nitride are formed in air.

The spraying and/or atomization of the electropositive metal may be carried out in any suitable way, for example by means of conventional nozzles or atomizers, or else by spraying/atomization through open-pored structures such as a pore burner. In addition, both spraying and atomization of the electropositive metal, for example by means of various feed devices having nozzles or atomizers, into the reaction space can take place. Thus, for example, atomization as powder is used, in particular embodiments, for the alkaline earth metals, in particular Ca and/or Mg.

In some embodiments, the reacted mixture of reaction gas and electropositive metal does not have to be completely reacted before mixing with water or an aqueous solution of a hydroxide of the electropositive metal, but instead a reaction can still also take place during mixing or after mixing. The reaction of electropositive metal with the reaction gas can thus have proceeded to completion before the mixing with water and/or an aqueous solution and/or suspension of a hydroxide of the electropositive metal or not; a reaction of electropositive metal with water can thus also still occur, so that hydrogen can be formed and can then remain in the system or be separated off with the gaseous products.

In some embodiments, the electropositive metal has reacted to completion with the reaction gas before the mixing with water and/or an aqueous solution and/or suspension of a hydroxide of the electropositive metal, e.g., the electropositive metal has reacted essentially quantitatively with the reaction gas, in order to avoid the formation of hydrogen. The use of an excess of reaction gas, e.g., an excess of nitrogen, for reacting the electropositive metal to completion is in particular embodiments.

The mixing with water or an aqueous solution of a hydroxide of the electropositive metal can be effected in a suitable way by spraying of liquid or gaseous water and/or by spraying and/or atomization of an aqueous solution and/or suspension/aqueous suspension of a hydroxide of the electropositive metal. In some embodiments, spraying is carried out in such a way that the reacted reaction gas is sprayed as completely as possible with water or the solution of a hydroxide of the electropositive metal. This can, for example, occur by means of one or more nozzles. A suitable combination of the mixing of the reacted mixture of reaction gas and electropositive metal with water and/or an aqueous solution and/or aqueous suspension of a hydroxide of the electropositive metal with the separation of the gaseous constituents from the solid and/or liquid constituents can make it possible, in particular embodiments, to control accumulation of the solid and/or liquid constituents in such a way that these accumulate on the separation apparatus and the hydrolysis of the nitrides produced can be localized, so that spraying/atomization can be set in a targeted manner.

The spraying and/or atomization of the water and/or the aqueous solution and/or suspension of a hydroxide of the electropositive metal can be carried out in a suitable way, for example, by means of conventional nozzles or atomizers. Thus, the water can, for example, be sprayed as liquid or in gaseous form. The aqueous solution of a hydroxide of the electropositive metal can likewise be sprayed in a suitable way, while the aqueous suspension of the electropositive metal can be sprayed or atomized depending on the solids content of the suspension. The spraying/atomization of an aqueous suspension of a hydroxide of the electropositive metal makes it possible to ensure good heat transport. A relatively high proportion of solids/solids content in the aqueous suspension may be present in particular embodiments, but suitable spraying or atomization has to be ensured. The proportion of solids can be set appropriately as a function of the reaction system and apparatus. Some embodiments may include spraying the water in liquid and gaseous form and at the same time spraying an aqueous solution of a hydroxide of the electropositive metal and spraying and/or atomizing an aqueous suspension of a hydroxide of the electropositive metal, but the introduction of water, aqueous solution, and/or aqueous suspension can also be combined in another way, for example by spraying of water and an aqueous solution of a hydroxide of the electropositive metal.

The mixing with water and/or an aqueous solution and/or suspension of a hydroxide of the electropositive metal additionally enables a hydroxide of the electropositive metal reacted during combustion to be produced from the reaction products, and this can be easily separated off, for example as suspension or in solution, by means of the water and/or the aqueous solution and/or suspension of a hydroxide of an electropositive metal. In addition, further energy can be liberated during this mixing by formation of the hydroxide, and this can be additionally used in the at least partial conversion into energy in addition to the energy already available from the reaction of the electropositive metal with the reaction gas. The reactions can generate not only heat of reaction but also pressure, for example by vaporization of water, which can likewise be utilized. Furthermore, energy of hydration can also be liberated.

Thus, for example, in the precipitation of the solid combustion product $LiN_3$ in a combustion of Li as electropositive metal with additional introduction of water, for example in a precipitation cyclone, the energy of hydration can additionally be obtained (lithium −509 kJ/mol). Not only the energy of hydrolysis but also the energy of hydration of the electropositive metal can thus be liberated in the hydrolysis of the nitride in some embodiments.

In the case of introduction of water and/or an aqueous solution and/or suspension of a hydroxide of the electropositive metal, a solution or suspension of a hydroxide, for example an LiOH solution/suspension, can be separated off as early as in a first separation device, and this can be sold as product of value or be reused in the present process. The step of mixing with water and/or an aqueous solution and/or suspension of a hydroxide of the electropositive metal may thus enable a number of advantages:

a) The temperature in the system can be kept at a level acceptable for the materials.

b) The water vaporizes and can thus increase the admission pressure in subsequent energy generation or energy conversion from the gaseous constituents, for example using a turbine, e.g., steam or expander turbine. The vaporized water thus provides the "mechanical" energy transport for the turbine, in a manner analogous to a steam turbine.

c) The upstream first reactor or burner for burning electropositive metal and reaction gas, for example Li or Mg and $N_2$, can be made weaker since additional energy is liberated in the hydration, which also saves material for the first reactor.

d) The sprayed water can wash the resulting hydroxide of the electropositive metal, for example an alkali metal such as lithium, out from a separation device such as a cyclone, so that the gaseous constituents which are being formed or are to be separated off, for example $N_2/NH_3/H_2O$, can be largely conveyed, preferably completely particle-free, to a turbine. Separation by means of a liquid is very effective here, as can also be seen from the following illustrative solubilities of lithium hydroxide in water, with no information having been given for higher temperatures which can prevail in the reactor and preferably also prevail for generating sufficient steam for operating the turbine.
Solubilities of lithium hydroxide in water:
12.7 g/100 ml (0° C.)
12.8 g/100 ml (20° C.)
17.5 g/100 ml (100° C.)

e) The plant/apparatus can be operated in such a way that the hydroxide solution/suspension exiting after the first separation device, which can, for example, be under pressure, has the temperature necessary for energy conversion, for example with the aid of a heat exchanger for generating steam, so that, for example, a steam turbine can then also be operated. Optionally, such a second steam turbine can also be coupled to an additional drive train of the first turbine which is operated using the gaseous constituents, for example the gas turbine.

f) The gas mixture formed does not contain oxygen and is therefore not corrosive.

g) Excess $N_2$ can be recirculated to the process since further constituents can be separated off well.

h) The energy generated can be released during the separation into firstly solid and/or liquid constituents and secondly gaseous constituents, for example to condensers in a cyclone or in other separation devices, and the low-temperature heat given off can be used for preheating or as district heating heat. Such waste heat can also be obtained after the second separation device in which ammonia is separated off.

i) A hydroxide solution, for example alkali metal hydroxide solution, taken off as liquid can take on a variety of further tasks. In addition, the electropositive metal can be recovered from this in an appropriate way. Thus, recyclable energy circuits are obtained for the example of Li via conversion of $Li_2CO_3$ into LiCl, and subsequent electrolysis to form Li.

The hydroxide of the electropositive metal may contain one or more of the above electropositive metals. The electropositive metal in the hydroxide can be different from or the same as that reacting in the reaction of the electropositive metal and the reaction gas. The electropositive metal of the hydroxide may be the same as that which is allowed to react with the reaction gas, in order that there are not a plurality of different electropositive metals present in the products produced, which may then have to be separated in a complicated manner.

The aqueous solution and/or suspension of the hydroxide of the electropositive metal may have additional constituents, for example various additives for stabilizing the solution/suspension, in particular antifoams, or other additives such as crystallization aids to set particular product properties (morphology), in addition to the hydroxide and water.

The conversion of energy may, for example, comprise conversion into thermal and/or electric energy. In some embodiments, at least electric energy is produced by the process of the invention and the apparatus of the invention.

The ammonia can be separated off together with excess water as aqueous solution, for example condensed, with ammonia solutions of different concentrations, for example, being able to be produced depending on the proportion of water or being able to be adjusted appropriately by addition of water. It is also conceivable, for example, to separate off ammonia by condensation. Gaseous ammonia can, for example, also be dispensed, in dried form, into pressure bottles.

The spraying and/or atomization of liquid and/or gaseous water and/or an aqueous solution and/or suspension of a hydroxide of the electropositive metal is not subject to any particular restrictions in respect of the amount of water and/or aqueous solution and/or suspension of the hydroxide of the electropositive metal. In particular embodiments, the temperature and/or the amount of the water and/or the aqueous solution and/or suspension of a hydroxide of the electropositive metal is set so that the heat of reaction from the exothermic reaction of reaction gas and electropositive metal is removed in a suitable way so that the apparatus for the reaction is not stressed excessively or the mechanical and thermal energy yield is maximized.

In some embodiments, the separation into firstly solid and/or liquid constituents and secondly gaseous constituents is effected by means of a cyclone and/or filter plates and/or electrofilter. For example, separation can also be carried out by means of a cyclone in which filter plates or at least one electrofilter are provided. The cyclone, the further plates and/or the electrofilter are not subject to any particular restrictions and can be provided in a suitable way. Here, a cyclone reactor can also serve as reactor for the spraying of the water or the aqueous solution of a hydroxide of the electropositive metal. As electrofilter, it is possible to employ, for example, a high-efficiency, e.g., washable, electrofilter which is made up of, for example, plates or wires and in which, for example, nozzles for introducing water can also be present.

Suitable combination of the mixing of the reacted mixture of reaction gas and electropositive metal with water and/or an aqueous solution and/or aqueous suspension of a hydroxide of the electropositive metal with the separation of the gaseous constituents from the solid and/or liquid constituents by means of a cyclone and/or filter plates and/or electrofilter enables, in particular embodiments, accumulation of the solid and/or liquid constituents to be controlled in such a way that they accumulate on the separation apparatus and the hydrolysis of the nitrides produced can be localized, so that the spraying/atomization can be set in a targeted manner.

Thus, for example, the solid constituents can be enriched in the outer region of the cyclone as a result of the cyclone or else on a plate filter, so that the hydrolysis can be effected in a very targeted manner.

The conversion of the energy from the solid and/or liquid constituents, which can, for example, have temperatures of 300° C. or more, can, in some embodiments, be carried out with the aid of at least one heat exchanger. This can then, for example, provide thermal energy. It is also possible for, for example, steam to be generated in the heat exchanger and subsequently be used to drive, for example, a turbine and a generator to generate electric energy. It is also possible for both thermal energy and electric energy to be generated with the aid of the heat exchanger. The thermal energy can, for example, be employed for preheating the electropositive metal and/or the reaction gas before the reaction, so that, for example, the electropositive metal can also be made available in liquid form, and/or for preheating the water and/or the aqueous solution and/or suspensions of a hydroxide of the electropositive metal, if desired. The thermal energy can, however, also be used for other purposes such as, for example, district heating heat. The electric energy obtained can also be used in an appropriate way, for example for supply of electric power.

The molar ratio of water, for example also in the solution and/or suspension of the hydroxide of the electropositive metal, to nitride formed in the combustion of reaction gas and electropositive metal is, in some embodiments, greater than 2:1, greater than 3:1, and/or greater than 3.5:1. In particular embodiments, the molar ratio of water, for example also in the solution and/or suspension of the hydroxide of the electropositive metal, to nitride formed in the combustion of reaction gas and electropositive metal is greater than 10:1, greater than 25:1, and/or greater than 50:1, in order to obtain sufficient gaseous constituents from the mixture mixed with water and/or the aqueous solution and/or suspension of a hydroxide of the electropositive metal and thus be able to discharge ammonia effectively as gaseous constituent. Even at a large excess of water, it is still possible, for example in the case of a condensation of the ammonia, for an aqueous solution of ammonia having a suitable concentration for further use or for sale to be obtained when the ammonia is separated off.

In some embodiments, the at least partial conversion of the energy from the gaseous constituents into electric energy is effected by means of at least one turbine and at least one generator. The type of turbine and of the generator are, as also in the case of the heat exchanger above, not subject to any particular restrictions.

In some embodiments, the electropositive metal is burnt with an excess of nitrogen. In this way, an increased yield can be achieved and the amount of by-products which can be formed, in particular, by reaction with water and have to be separated off can be minimized, so that the purification of the by-products can also be made easier. In addition, additional nitrogen can be used for reaction control and reaction monitoring. In some embodiments, the excess nitrogen can be separated off from the gaseous constituents after the combustion and be recirculated to the combustion.

In some embodiments, the present invention provides an apparatus for producing ammonia and energy, comprising:
   a first reactor in which an electropositive metal selected from among alkali metals, alkaline earth metals, and zinc, and mixtures and/or alloys thereof is allowed to react with a reaction gas comprising nitrogen and which is configured for reacting the reaction gas comprising nitrogen with the electropositive metal;
   at least one first spraying device and/or atomization device for spraying and/or atomizing the electropositive metal, which is configured for spraying and/or for atomizing the electropositive metal into the first reactor;

at least one first feed device for the electropositive metal, which is configured for feeding the electropositive metal to the at least one first spraying device and/or atomization device;

at least one second feed device for reaction gas comprising nitrogen, which is configured for feeding the reaction gas comprising nitrogen to the first reactor;

a second reactor in which the reacted mixture of reaction gas and electropositive metal is mixed with water and/or an aqueous solution and/or suspension of a hydroxide of the electropositive metal and is configured for mixing the reacted mixture of reaction gas and electropositive metal with water and/or the aqueous solution and/or suspension of a hydroxide of the electropositive metal;

at least one second spraying device and/or atomization device for spraying and/or atomizing water and/or the aqueous solution and/or suspension of a hydroxide of the electropositive metal, which is configured for spraying and/or atomizing water and/or the aqueous solution and/or suspension of a hydroxide of the electropositive metal into the second reactor;

at least one third feed device for water and/or an aqueous solution and/or suspension of a hydroxide of the electropositive metal, which is configured for feeding water and/or the aqueous solution and/or suspension of a hydroxide of the electropositive metal to the at least one second spraying device and/or atomization device;

a first separation device in which the mixture mixed with water and/or the aqueous solution and/or suspension of a hydroxide of the electropositive metal is separated into firstly solid and/or liquid constituents and secondly gaseous constituents and which is configured for separating the mixture mixed with water and/or the aqueous solution and/or suspension of a hydroxide of the electropositive metal into firstly solid and/or liquid constituents and secondly gaseous constituents;

at least one first device for converting energy, which is configured for at least partly converting the energy of the solid and/or liquid constituents;

at least one second device for converting energy, which is configured for at least partly converting the energy of the gaseous constituents; and a second separation device in which ammonia is separated off from the gaseous constituents and which is configured for separating off ammonia from the gaseous constituents.

The first reactor and the second reactor are not subject to any particular restrictions in respect of their construction and material, etc., as long as the appropriate reactions can proceed therein. Depending on the type, nature (e.g., temperature, pressure), and/or amount of in each case the reaction gas, the electropositive metal, the water, and/or the aqueous solution and/or suspension of a hydroxide of the electropositive metal, etc., these can be configured accordingly. Likewise, the separation devices, feed devices, spraying devices, discharge devices, and recirculation devices are not subject to any particular restrictions. For example, the first reactor can be a combustion chamber or a combustion tube.

A suitable material for the first reactor and/or the second reactor, the separation devices, spraying devices, atomization devices, discharge devices, and/or the feed devices, or else, for example, apparatuses for the conversion of energy, e.g., turbines which are coupled with generators, is, in particular embodiments, a material selected, for example, from the group consisting of iron, chromium, nickel, niobium, tantalum, molybdenum, tungsten, zirconium, and alloys of these metals and also steels such as stainless steel and chromium-nickel steel. These materials may be used at relatively high temperatures at which the reaction with, for example, liquid electropositive metal can proceed more easily or the reaction mixture can be treated in a simple manner. In some embodiments, the temperature of the reaction mixture can be reduced by the introduction of water and/or the aqueous solution and/or suspension of a hydroxide of the electropositive metal into the second reactor to such an extent that the parts following in the flow direction are subjected to a lower temperature and these can therefore also be made of less heat-resistant materials.

The first feed device for the electropositive metal may include tubes, hoses, or conveyor belts, which can be heated and can be determined appropriately, for example in accordance with the state of matter of the electropositive metal. Thus, the alkaline earth metals, e.g., Mg and Ca, are, for example in particular embodiments, introduced in particle form, for example as powder, while Li can be introduced, for example, as melt. A further feed device for a gas with or without a control device such as a valve by means of which the introduction of the electropositive metal can be regulated, can also be installed on the first feed device for the electropositive metal.

Likewise, the second feed device for the reaction gas may comprise a tube or hose, etc., which can optionally be heated, with a suitable second feed device determined appropriately on the basis of the state of the gas, which can be under pressure. It may include a plurality of first and/or second feed devices for electropositive metal and/or reaction gas.

The third feed device for water and/or the aqueous solution and/or suspension of a hydroxide of the electropositive metal may comprise a tube or hose, etc., which can optionally be heated, with a suitable third feed device likewise being able to be determined appropriately on the basis of the state of the water and/or the aqueous solution and/or suspension of a hydroxide of the electropositive metal, which can be under pressure. A plurality of third feed devices for water and/or the aqueous solution and/or suspension of a hydroxide of the electropositive metal can also be provided.

In some embodiments, an ignition device is upstream of or in the first reactor to ignite the reaction gas and/or the electropositive metal and thus start the reaction. The ignition device is not subject to any particular restrictions here and can, for example, comprise a high-voltage source, an electric arc, etc.

The first and second spraying device and/or atomization device are likewise not subject to any particular restrictions, as long as the respective materials, e.g., the electropositive metal and water and/or the aqueous solution and/or suspension of a hydroxide of the electropositive metal, can be sprayed or atomized therein. They may comprise a material which is not damaged by the substances, for example an alkali-resistant spraying device and/or atomization device if an aqueous solution and/or suspension of a hydroxide of the electropositive metal is sprayed by means of the second spraying device and/or atomization device. This likewise applies to the corresponding feed devices. The spraying and/or atomization may provide that the materials, e.g., the electropositive metal and water and/or the aqueous solution and/or suspension of a hydroxide of the electropositive metal are sprayed or atomized very completely into the reaction gas or into the reacted mixture, which can be achieved by appropriate construction of the spraying device and/or atomization device, which comprises, for example, appropriate nozzles or atomizers.

In addition, the first and second feed devices meeting upstream of the first spraying device and the electropositive metal being sprayed together with the reaction gas is not ruled out.

Furthermore, the separation devices in the apparatus of the invention are not subject to any particular restrictions as long as a separation into firstly solid and/or liquid constituents and secondly gaseous constituents can be achieved in the first separation device and ammonia can be separated off in the second separation device. The second separation device can also be located in the second device for the conversion of energy and the first separation device can also be located in the second reactor. It is also possible for the first reactor and the second reactor to be located in a passage-like vessel or the like.

The first separation device is not subject to any particular restrictions as long as a separation into firstly gaseous constituents and secondly solid and/or liquid constituents can be ensured. In the apparatus of the invention, the first separation device has, in particular embodiments, a cyclone and/or at least one filter plate and/or at least one electrofilter. Combinations of these separation devices are not ruled out here.

The cyclone or cyclone reactor is not subject to any particular restrictions in terms of its construction and can, for example, have a shape like conventional cyclone reactors. For example, a cyclone reactor can comprise a reaction zone, which can also correspond to the second reactor, for example in the form of a rotationally symmetric upper part, a separation zone which is, for example, conical, and a depressurization chamber on which at least one discharge device for solid and/or liquid constituents, for example in the form of a star feeder, and also at least one discharge device for gaseous constituents can be installed.

A cyclone reactor may also have a different structure and optionally also comprise further regions. For example, individual regions (e.g., reaction zone, separation zone, depressurization chamber) can also be combined in one component of an illustrative cyclone reactor and/or extend over a plurality of components of a cyclone reactor.

The filter plates and/or electrofilters, which can comprise filter tubes, are also not subject to any particular restrictions and can, for example, also be used in combination with a cyclone. In particular embodiments, the filter plates or tubes contain a feed conduit for water in order to hydrolyze or wash off the precipitated solids. The filters, filter plates and/or electrofilters can, like the cyclone, be made of the abovementioned corrosion-resistant materials, e.g., for example, a material selected from the group consisting of iron, chromium, nickel, niobium, tantalum, molybdenum, tungsten, zirconium and alloys of these metals and also steels such as stainless steel and chromium-nickel steel.

In particular embodiments, the at least one first device for the conversion of energy has at least one heat exchanger. This is, not subject to any particular restrictions and can, for example, also be coupled with at least one turbine and at least one generator for generating electric energy, but can also be used additionally or exclusively for generating thermal energy.

The apparatus, in particular embodiments, includes a control device which sets the molar ratio of water and/or the aqueous solution and/or suspension of a hydroxide of the electropositive metal to nitride formed in the combustion of reaction gas and electropositive metal by controlling the at least one first feed device for electropositive metal and/or the at least one second feed device for reaction gas comprising nitrogen and/or the at least one third feed device for water and/or the aqueous solution and/or suspension of a hydroxide of the electropositive metal in such a way that the molar ratio of water and/or the aqueous solution and/or suspension of a hydroxide of the electropositive metal to nitride formed in the combustion of reaction gas and electropositive metal is greater than 2:1, greater than 3:1, and/or greater than 3.5:1. In particular embodiments, the control device can set the molar ratio of water, for example also in the solution and/or suspension of the hydroxide of the electropositive metal, to nitride formed in the combustion of reaction gas and electropositive metal also to greater than 10:1, greater than 25:1, and/or greater than 50:1, in order to obtain sufficient gaseous constituents from the mixture mixed with water and/or the aqueous solution and/or suspension of a hydroxide of the electropositive metal and thus be able to discharge ammonia effectively as gaseous constituent.

The control device can, for example, control the addition of electropositive metal, reaction gas and/or water and/or the aqueous solution and/or suspension of a hydroxide of the electropositive metal by control of nozzles, for example on or in the feed devices or the reactors, respectively, or else control the feed devices themselves, for example by control of pumps, etc., in order to set the appropriate molar ratio.

In particular embodiments, the at least one second device for converting energy has at least one turbine and at least one generator for generating electric energy or for converting into electric energy. The turbine and the generator are, as also above in the case of coupling to the heat exchanger, not subject to any particular restrictions and it is also possible to employ a plurality of different turbines which are connected to one or more generators.

The second separation device may be configured so that nitrogen is additionally separated off from the gaseous constituents. Such a separation can occur automatically, for example when pure nitrogen is used as reaction gas and water vapor is condensed out from the gaseous constituents after the reaction and mixing with water or an aqueous solution and/or suspension. However, when the reaction gas has a different nature, nitrogen can also be separated off by, for example, fractionation of the exhaust air after ammonia and optionally water have been separated off. In such embodiments with separation of nitrogen, the apparatus of the invention can additionally be provided with a recirculation device for nitrogen from the second separation device, which is configured to feed nitrogen from the second separation device to the second feed device for reaction gas comprising nitrogen and/or to the first reactor. In this way, excess nitrogen can be made available again as reaction gas, so that the process of the invention can be carried out even more effectively. The recirculated nitrogen can, in particular embodiments, have been preheated.

The above embodiments, configurations and further developments can, if this serves a good purpose, be combined with one another in any way. Further possible embodiments, further developments and the implementations of the invention also encompass combinations which have not been explicitly mentioned above of features of the invention described above or below in the context of the working examples. In particular, a person skilled in the art will also add individual aspects as improvements or supplements to the respective basic form of the present teachings.

A first illustrative embodiment is schematically shown in FIG. 1. Firstly, a combustion of an electropositive metal, for example lithium or magnesium, which is fed in via a first feed device 2 for electropositive metal and a first spraying and/or atomization device 2a into the first reactor 1 with a reaction gas comprising nitrogen takes place in a first reactor 1, for example a combustion tube. The combustion can, for example, take place in a nitrogen-containing atmosphere, which can, for example, also consist only of nitrogen. The reaction gas is fed via one or more second feed devices 3 for reaction gas into the first reactor 1. The amount of nitrogen can, as described above, be selected so that the burner overall does not overheat. For this purpose, a valve which can regulate the nitrogen and/or ammonia content of the reaction gas or of the gaseous products formed or the amount of reaction gas for the combustion and thus also for an ultimately driven gas turbine can be integrated, for example. A mixture of gas and solid, e.g. $N_2$ and $Li_3N$ or $Mg_3N_2$, for example, can be formed by the combustion.

The reacted mixture of electropositive metal and reaction gas is then conveyed into the second reactor 4 where it is sprayed with water and/or an aqueous solution and/or suspension of a hydroxide of the electropositive metal from one or more second spraying devices and/or atomization devices 5, for example water nozzles. This mixture is then separated into firstly solid and/or liquid constituents 7 and secondly gaseous constituents 8 in a first separation device 6, for example a cyclone 6a. For example, a nitride such as $Li_3N$ can here be converted into LiOH which is then dissolved, and ammonia is additionally formed. Magnesium hydroxide from a reaction of magnesium nitride with water has, for example, only limited solubility, as a result of which a suspension is formed.

The solid and/or liquid constituents 7 from this mixture, for example an LiOH solution or magnesium hydroxide suspension, can then release heat in a first device 9 for converting energy, comprising, for example, a heat exchanger 9a, a steam turbine 9b and a generator 9c and thus, for example, generate electricity before it can then be obtained as products of value, be recycled and/or be used for recovery of the electropositive metal.

The gaseous constituents 8, for example $N_2/NH_3/H_2O$, which may be under pressure, can be conveyed into a second device 10 for converting energy, for example having an expander turbine 10a and a generator 10b, in order to generate electricity, with ammonia also being able to be separated off appropriately here or at another place, for example with the aid of a condenser 11, so that, for example, an aqueous, for example saturated or supersaturated, ammonia solution 12 whose concentration can be set appropriately can then be obtained. In addition, nitrogen can be separated off from the gaseous constituents and can then be made available again via a return conduit 13 to the second feed device 3.

A second illustrative embodiment is depicted in FIG. 2; this differs from the embodiment in FIG. 1 in the arrangement of the reactors 1, 4 and the second spraying devices/atomization devices 5 and also in that an electrofilter 6b is used instead of the cyclone 6a as first separation device 6. Here, the electrofilter 6b can, in particular embodiments, also itself have, for example, nozzles for the introduction of water and/or an aqueous solution and/or suspension of a hydroxide of the electropositive metal.

The present teachings may be embodied in a process and a power station plant for producing ammonia and energy, in particular electricity, by means of turbines. The solid and/or liquid combustion products can be removed by means of aqueous suspensions/solutions, which allows a simple reaction procedure. The salt solutions/suspensions formed are so hot that they can additionally operate a steam turbine by means of a heat exchanger. The process sequence is made possible by the high energy density of the electropositive metals. Overall, an apparatus, for example a power plant, can be operated with reduced emissions, with all output products utilized.

What is claimed is:

1. A method for producing ammonia and energy, the method comprising:
   spraying or atomizing an electropositive metal selected from among alkali metals, alkaline earth metals, aluminum and zinc and mixtures and/or alloys thereof;
   burning the electropositive metal with a reaction gas comprising nitrogen;
   mixing the reacted mixture of reaction gas and electropositive metal with water or an aqueous solution or suspension of a hydroxide of the electropositive metal;
   separating the mixture into (a) solid and liquid constituents and (b) gaseous constituents including ammonia;
   at least partially removing thermal energy of the solid and liquid constituents with a heat exchanger and at least partially removing kinetic energy of the gaseous constituents with a turbine and a generator; and
   separating the ammonia from the gaseous constituents;
   wherein mixing the reacted mixture of reaction gas and electropositive metal with water or an aqueous solution or suspension of a hydroxide of the electro-positive metal includes spraying or atomizing the water or the aqueous solution or the suspension of the hydroxide of the electropositive metal into the reacted mixture.

2. The method as claimed in claim 1, wherein separating the mixture comprises using a cyclone, filter plates, or electrofilters.

3. The method as claimed in claim 1, wherein the molar ratio of water to nitride formed in the combustion of reaction gas and electropositive metal is greater than 2:1.

4. The method as claimed in claim 1, further comprising burning the electropositive metal with an excess of nitrogen.

5. The method as claimed in claim 4, further comprising separating excess nitrogen from the gaseous constituents after combustion and recirculating the excess nitrogen for additional combustion.

* * * * *